United States Patent [19]
Goetzberger et al.

[11] 4,146,790
[45] Mar. 27, 1979

[54] APPARATUS FOR CONVERTING LIGHT ENERGY INTO HEAT ENERGY BY LIGHT CONCENTRATION BY MEANS OF FLUORESCENT LAYERS

[75] Inventors: Adolf Goetzberger, Merzhausen; Waldemar Greubel, Denzlingen, both of Fed. Rep. of Germany

[73] Assignee: Fraunhofer-Gesellschaft zur Förderung der angewandten Forschung e.V., Munich, Fed. Rep. of Germany

[21] Appl. No.: 804,210

[22] Filed: Jun. 7, 1977

[30] Foreign Application Priority Data

Jul. 1, 1976 [DE] Fed. Rep. of Germany ....... 2629641

[51] Int. Cl.² .............................................. G01J 1/00
[52] U.S. Cl. .................................... 250/336; 250/302; 250/368
[58] Field of Search .............. 250/212, 302, 368, 372, 250/336, 461; 136/89 PC; 126/270, 271

[56] References Cited

U.S. PATENT DOCUMENTS

| 3,379,394 | 4/1968 | Bialy ................................ 126/270 R |
| 3,426,212 | 2/1969 | Klaas ................................ 250/486 |
| 3,929,510 | 12/1975 | Kittl ................................ 136/89 HY |
| 4,041,318 | 8/1977 | Poulsen ............................ 250/461 R |

OTHER PUBLICATIONS

"Characteristics of a Water Absorber . . ." by Chappell & White, Applied Physics Letters, vol. 28, No. 8, Apr. 15, 1976, pp. 422, 423.

Primary Examiner—Harold A. Dixon
Attorney, Agent, or Firm—John C. Smith, Jr.

[57] ABSTRACT

The present invention provides an apparatus in which one or more light concentrators comprising thin layers of transparent solid or liquid materials with embedded fluorescent centers are combined with absorbers in order to convert solar light into heat energy at high temperatures.

8 Claims, 4 Drawing Figures

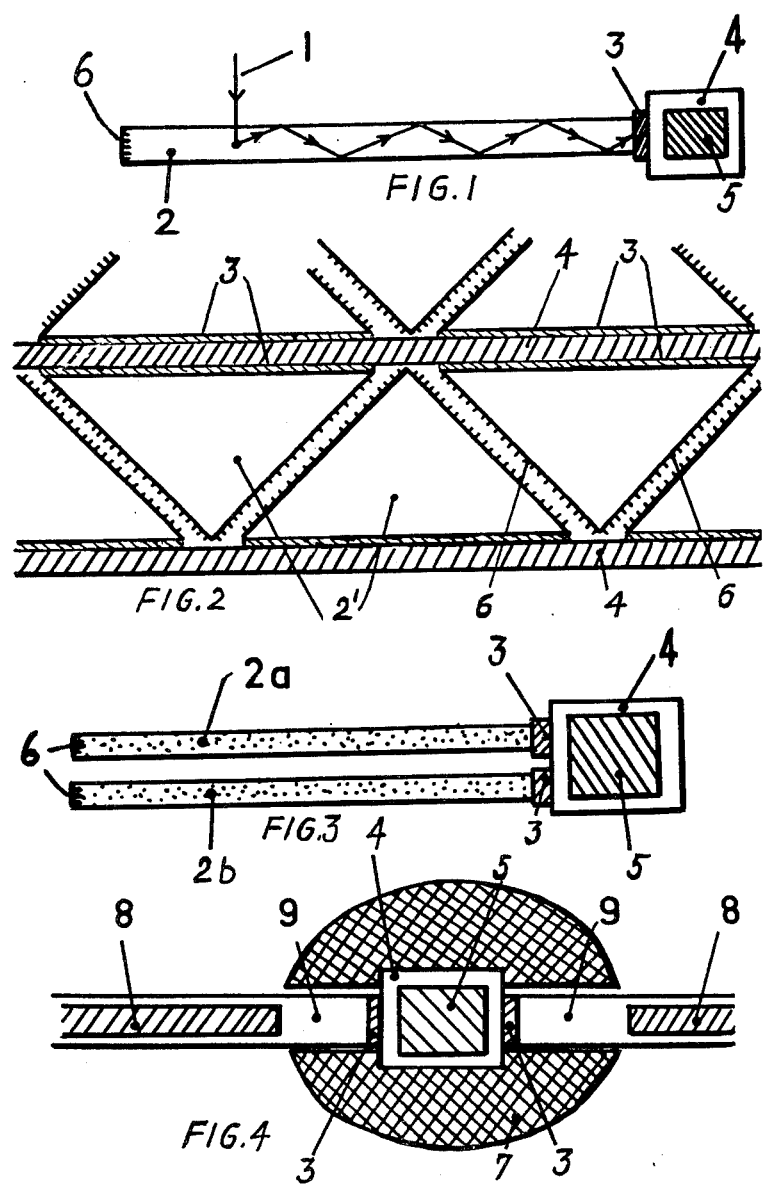

4,146,790

APPARATUS FOR CONVERTING LIGHT ENERGY INTO HEAT ENERGY BY LIGHT CONCENTRATION BY MEANS OF FLUORESCENT LAYERS

BACKGROUND OF THE INVENTION

This invention relates to an apparatus for converting light energy into heat energy by light concentration by means of fluorescent layers.

The generation of heat energy from solar radiation is performed practically already in various ways. Two different principles have found use:
1. Areal collectors with no concentration which are also suited for diffuse light.
2. Light concentrators which concentrate solar light on a small area by means of reflectors or lenses.

Collectors of the first type have the disadvantage that they generate only relatively low temperatures because of the low energy density of the incident radiation. Even in case of very intensive sun radiation, the temperature reached in this way mostly is below 100° C. Collectors of the second type reach substantially higher temperatures because of a concentration of the solar light, but they only work with clear sky and require a complex readjustment in order to always be oriented toward the sun.

SUMMARY OF THE INVENTION

It is the object of the present invention to avoid these disadvantages and to provide an apparatus for converting light energy into heat energy by light concentration by means of fluorescent layers, which is simple in construction, economical to operate and which will effectively and efficiently perform the purposes for which it is intended.

To attain this object the present invention provides an apparatus for converting light energy into heat energy, comprising at least one light concentrator consisting of a transparent solid or liquid layer the index of refraction of which is greater than that of the surrounding medium and which contains fluorescent centers; a light absorber for absorbing the light emitting from the light concentrator, and heat transportants adapted to flow through said light absorber.

BRIEF DESCRIPTION OF THE DRAWING

Several preferred embodiments of the invention will now be described by way of example and with reference to the accompanying drawing, in which:

FIG. 1 is a cross section of an apparatus for a light concentration in conjunction with an absorber;

FIG. 2 is a cross section of an example for a favorable geometrical configuration of a light concentrator/absorber system;

FIG. 3 is a similar view of a two-layer arrangement of a light concentrator/absorber apparatus; and FIG. 4 shows an optical coupling of the light concentrators with the absorber through the intermediary of glass intermediate layers for avoiding a thermal loading of the fluorescent layers.

DESCRIPTION OF THE PREFERRED EMBODIMENTS

The solution proposed by the present invention permits a combination of the advantages of the two principles without the disadvanteages thereof. A light concentrator is used which is based on a fluorescent layer. Sunlight is collected in a layer transparent per se which contains fluorescent centers. The fluorescent centers absorb the radiation in a predetermined wavelength range, convert it into longer-wave radiation and re-emit it. Since the radiation is re-emitted into all directions, a very large portion of this radiation by virtue of total reflection remains in the layer and is transmitted in the layer plane. When the fluorescent coloring substance is selected in such a way that absorption and emission bands have as little overlapping as possible, the absorption length of the re-emitted light is very large, i.e., large concentrator surfaces are possible. The concentrator may consist of plastics or glass in which the fluorescent molecules are dissolved, or also of a liquid solution which is contained between two transparent panels.

In FIG. 1 it has been illustrated how a light beam 1 impinges a fluorescent molecule of a concentrator 2, is emitted wavelength displaced after absorption and arrives at the edge of the concentrator 2 by total reflection. There it encounters, preferably through the intermediary of an optical contact substance 3, such as e.g. highly viscous silicon oils, an absorber 4 through which a liquid heat transportant 5 flows.

FIG. 2 shows an embodiment where the concentrators $2^1$ are reflectively coated at their faces 6 and where the light is concentrated on the absorbers 4 in which the heat transportants 5 not illustrated flow.

It has proved to be advantageous when the light is absorbed in more than one concentrator panel, as illustrated in FIG. 3. The concentrators 2a and 2b each select a portion of the incident light and pass it to the absorber 4. With two concentrator panels arranged superimposed, four spectrum ranges of incident light are able to be passed to the absorber. A difference over the photovoltaic use is the spectral distribution of the emission wavelengths. Since the wavelength is not limited upwardly by the absorption edge of a semi-conductive material, the long-wave portion of the sun spectrum is also able to be jointly used. A further difference is the temperature of the absorber. Since the efficiency of solar cells decreasing with increasing temperature here does not have to be taken into account, the absorber is able to be operated at much higher temperatures and thus more efficiently.

Further advantages over the conventional collectors described initially are to now be described hereinafter:
1. Higher concentration. Even with reflector collectors only concentration ratings up to 10 are possible with reasonable investment, while with fluorescent layers concentration ratings of between 50 and 100 bring about no difficulties. Thus, an efficient operation of heat power machines and air conditioning systems appears to be possible. At high absorber temperatures, it has to be prevented that the fluorescent molecules and their solution medium come too close to the absorber. This can be prevented with an arrangement like that shown in FIG. 4: The absorber 4 is surrounded by a heat insulation 7. The fluorescent centers are embedded in a liquid or solid transparent layer 8 which is surrounded by glass layers 9. When the solution medium and the glass generally have the same index of refraction, the light is also transmitted in the glass. Thus, a glass intermediate layer is provided between the fluorescent medium and abosrber.
2. Separation of collector and absorber. In conventional collectors, the collector is at the same time the absorber, like with the flat collector, or it at least has to absorb radiation over its entire surface, like with the reflector collector. This gives rise to heat insulation problems. The solution of these problems is possible, but complex, e.g. by vacuum installation of the absorbers as well as by selectively absorbing layers on shielding glasses. With the fluorescent collector, the light passes into small-area absorbers at the faces of the collectors, the absorbers themselves not having to be used for a direct radiation receiving. Therefore, the absorbers are able to be well heat-insulated (FIG. 4), and thus heat losses are able to be reduced. 3. Low thermal inertia. In case of rapidly changing cloud conditions like they frequently occur in Middle Europe, the thermal inertia of the system absorber-collector plays a decisive role. With flat collectors, a pipe system containing water is exposed to the sun. The water quantity contained in the collector should be as low as possible since thereby the heat-up time is reduced and thus the efficiency averaged on a time basis increases. The fluorescent collector on the other hand itself heats up only immaterially, while the absorber contains a heat capacity low relative to the total surface. Because of the low thermal inertia of the system a very quickly reacting pump system must adapt the coolant flow through the absorber to radiation conditions. A control most conveniently is effected by a solar cell or a photo-electric cell scanning the incident radiation.

As a further embodiment of the apparatus of this invention, by way of example, reference is had to the possibility of additionally combining light concentrators of the type described with solar cells for the higher-energetical portions of the fluorescent radiation for generating electrical energy.

Water under high pressure or other higher boiling liquids, e.g. oil, may for instance serve as heat transportant.

As an absorber, any surface black for fluorescence having a good heat transmission may be used, e.g. metal pipes painted black.

The invention may be embodied in other specific forms without departing from the spirit or essential characteristics thereof. The embodiments are therefore to be considered in all respects as illustrative and not restrictive.

What is claimed is:

1. An apparatus for converting light energy into heat energy, comprising
   (a) at least one light concentrator for receiving solar energy and comprising a stationary transparent solid or liquid material, the index of refraction of which is greater than that of the surrounding medium and which contains fluorescent centers, said material being adapted to conduct light therethrough emitted by said fluorescent centers;
   (b) a light absorber adjacent at least a portion of said concentrator for absorbing the light conducted through said light concentrator, and
   (c) a heat transportant adapted to flow along a path in contact with said light absorber to convey thermal energy away from said light absorber.

2. An apparatus according to claim 1, wherein several light concentrators are arranged in laminated, superimposed relationship, each concentrator being adapted to convert only a part of the incident solar spectrum into fluorescent light.

3. An apparatus according to claim 1, wherein emission and absorption spectra of the fluorescent centers are correlated with one another in such a way that a portion of the incident spectrum as large as possible is absorbed and is passed to the light absorber.

4. An apparatus according to claim 1, wherein the light absorber is capable of operation at temperatures in excess of 100° C.

5. An apparatus according to claim 1, wherein a liquid fluorescent layer is separated by a glass intermediate layer having an index of refraction adapted to the fluorescent layer from the absorber, the thickness of the glass intermediate layer being rated such that the temperature of the fluorescent layer is maintained below 40° C.

6. An apparatus according to claim 1, further comprising at least one reflective coating on at least one face of the light concentrator to direct said light towards said absorber.

7. An apparatus according to claim 1, wherein for a better light uncoupling from the light concentrator an optical contact substance is provided between said light concentrator and said light absorber.

8. An apparatus according to claim 7, wherein said optical contact substance is a silicon oil.

* * * * *